Figure 4:
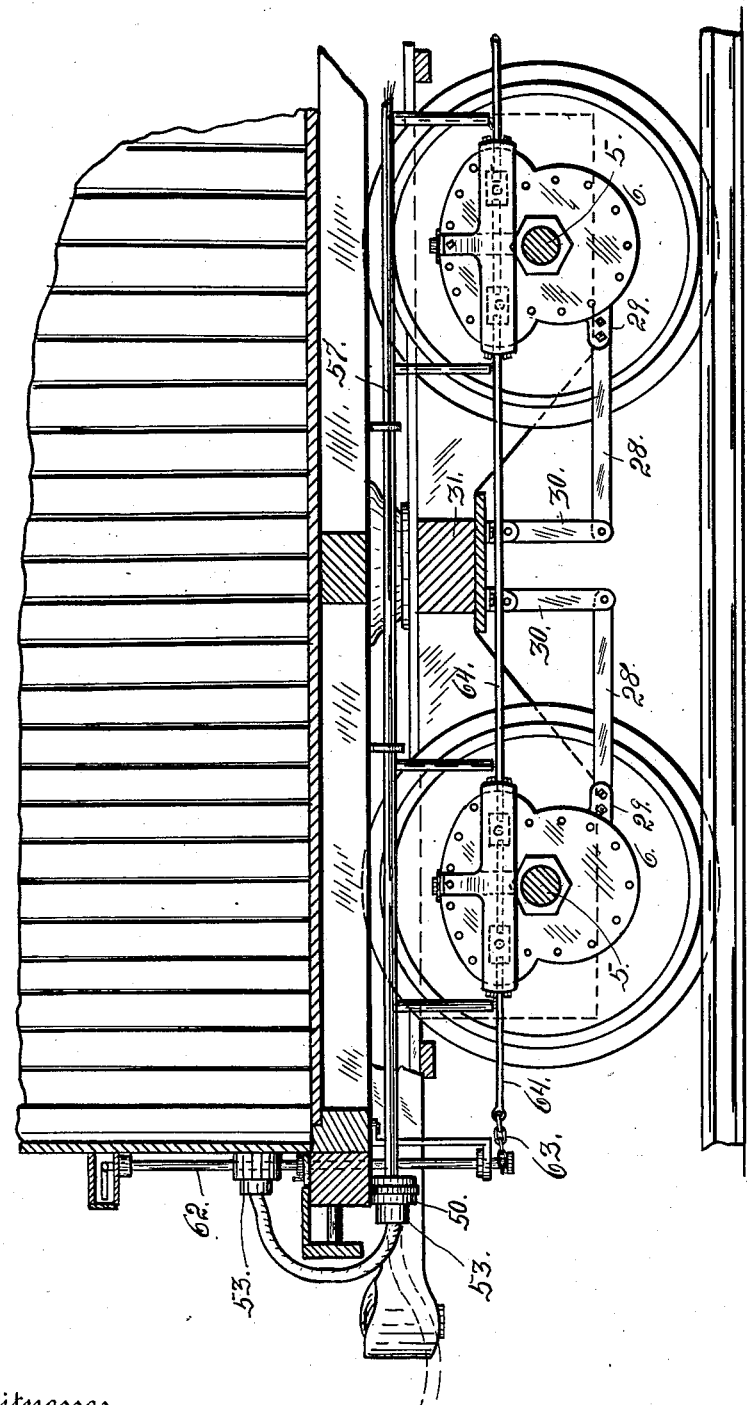

A. P. SCHMUCKER.
LIQUID BRAKE FOR RAILWAY CARS.
APPLICATION FILED MAR. 7, 1907. RENEWED JUNE 3, 1911.
1,008,201.
Patented Nov. 7, 1911.
7 SHEETS—SHEET 1.
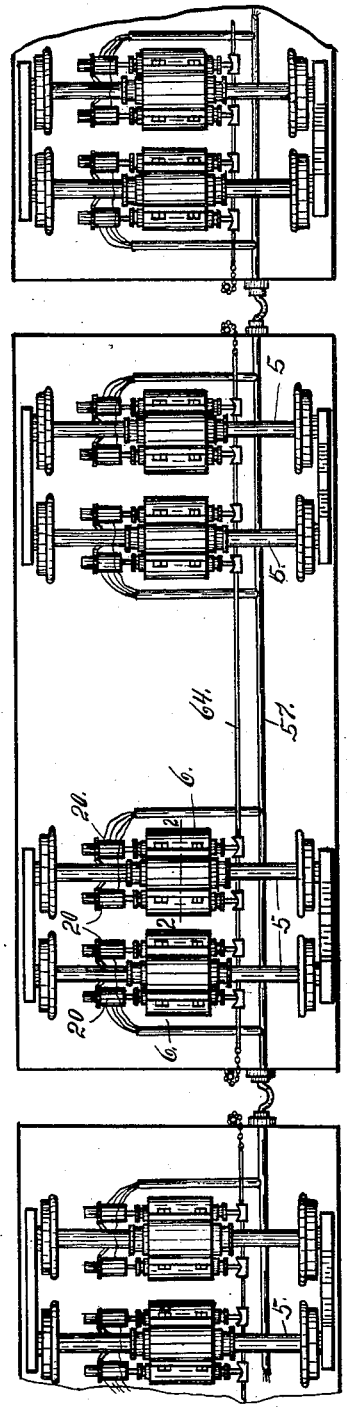
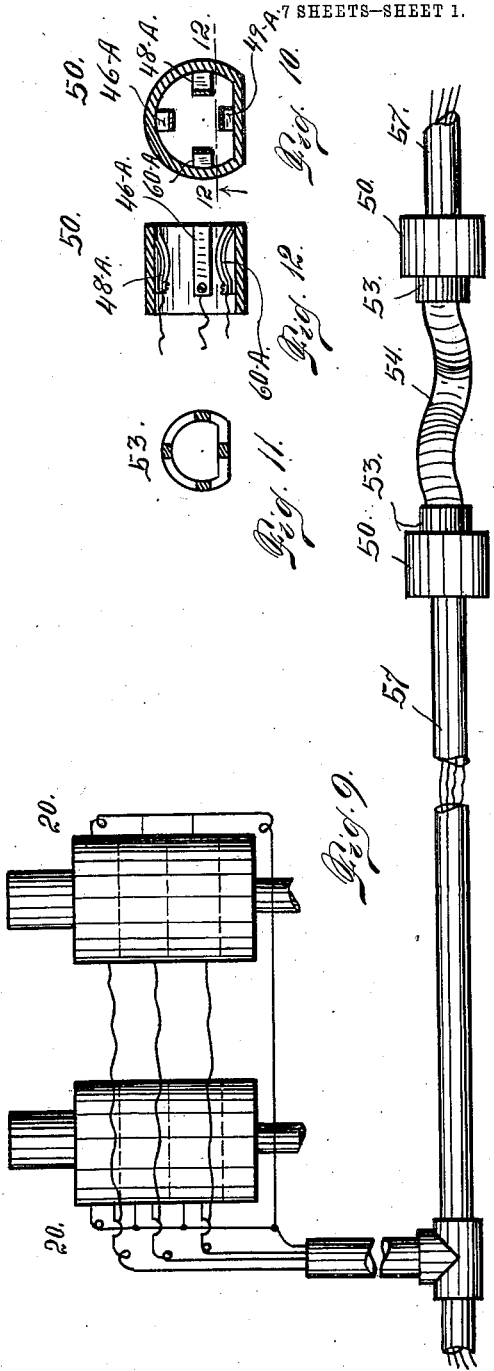

A. P. SCHMUCKER.
LIQUID BRAKE FOR RAILWAY CARS.
APPLICATION FILED MAR. 7, 1907. RENEWED JUNE 3, 1911.
1,008,201.
Patented Nov. 7, 1911.
7 SHEETS—SHEET 2.
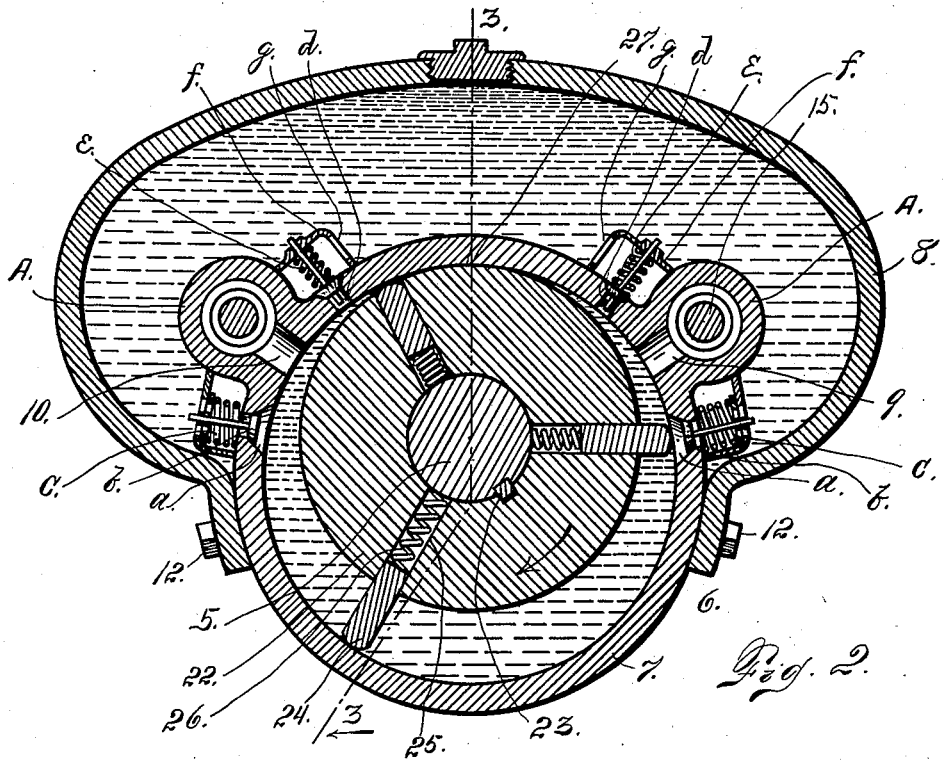
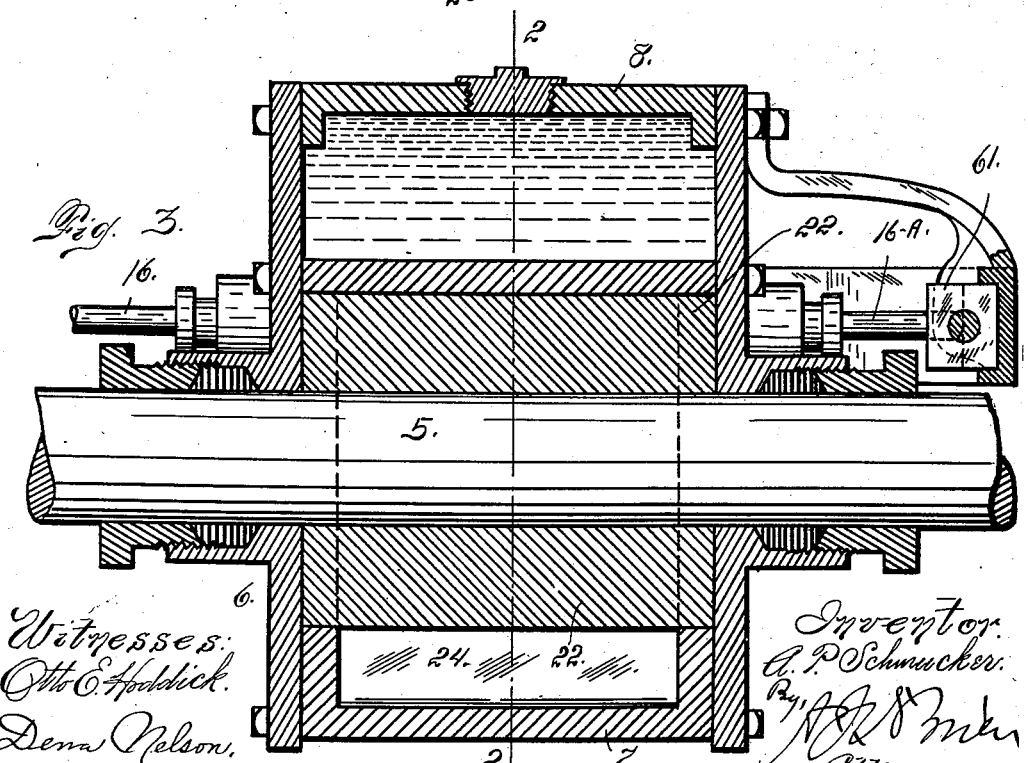
Witnesses:
Otto E. Hoddick.
Dena Nelson.
Inventor.
A. P. Schmucker.
By
Attorney.

A. P. SCHMUCKER.
LIQUID BRAKE FOR RAILWAY CARS.
APPLICATION FILED MAR. 7, 1907. RENEWED JUNE 3, 1911.

1,008,201.

Patented Nov. 7, 1911
7 SHEETS—SHEET 3.

Witnesses
Otto E. Hoddick.
Dena Nelson.

Inventor
A. P. Schmucker.
Attorney

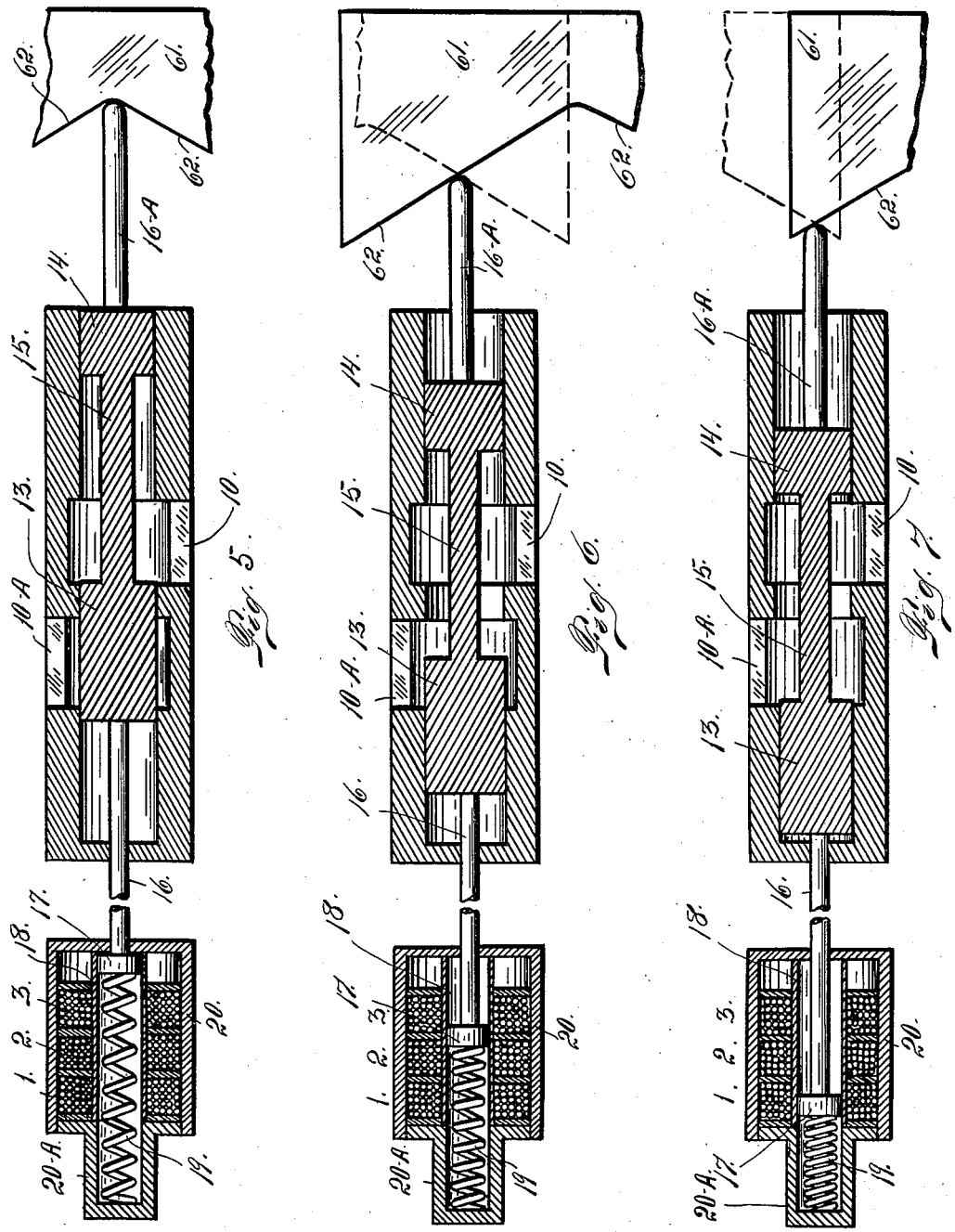

A. P. SCHMUCKER.
LIQUID BRAKE FOR RAILWAY CARS.
APPLICATION FILED MAR. 7, 1907. RENEWED JUNE 3, 1911.

1,008,201. Patented Nov. 7, 1911.
7 SHEETS—SHEET 6.

Witnesses
Otto E. Hoddick
Dena Nelson

Inventor
A. P. Schmucker
By
Attorney

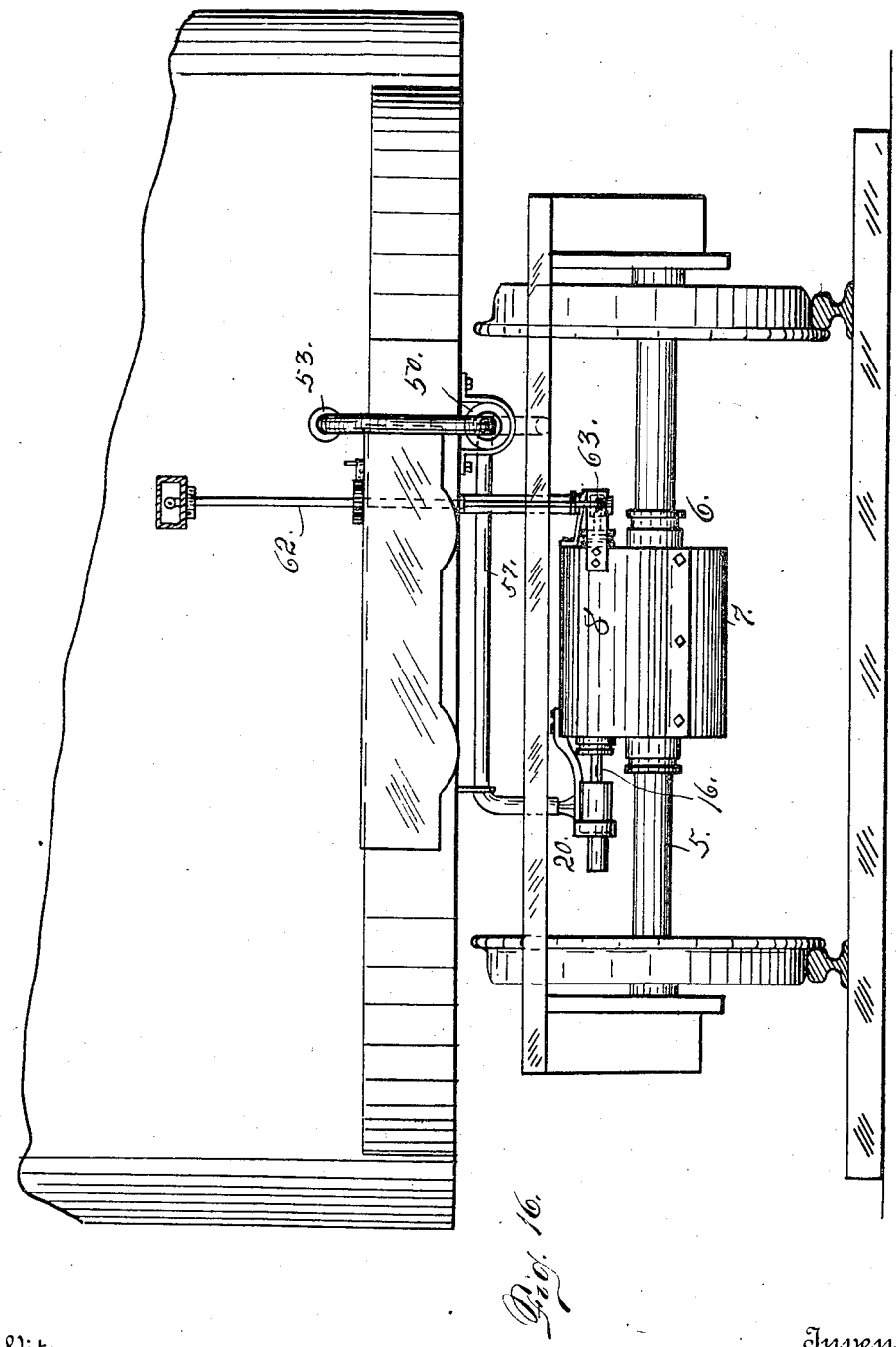

UNITED STATES PATENT OFFICE.

ALFRED P. SCHMUCKER, OF DENVER, COLORADO.

LIQUID-BRAKE FOR RAILWAY-CARS.

1,008,201.  Specification of Letters Patent.  Patented Nov. 7, 1911.

Application filed March 7, 1907, Serial No. 361,139. Renewed June 3, 1911. Serial No. 631,087.

*To all whom it may concern:*

Be it known that I, ALFRED P. SCHMUCKER, a citizen of the United States, residing in the city and county of Denver and State of Colorado, have invented certain new and useful Improvements in Liquid-Brakes for Railway-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in brakes for railway cars.

In my improved construction a rotary pump is mounted on each axle of the car, the pump casing being in communication by main inlet and exit ports with a liquid-containing reservoir also carried by the axle of the car. Within the pump casing which is cylindrical in cross section, is eccentrically mounted a cylinder which is tangential to the inner surface of the casing at a point intermediate the two ports. The said cylinder in the form of construction shown in the drawing, is provided with a number of spring-actuated blades, the said blades sliding freely in ways formed in the cylinder, the latter being made fast to the car axle, whereby as the axle is rotated together with the pump cylinder, the liquid within the reservoir is circulated, the same entering at one port and being expelled through the other port by the expansible or spring-actuated blades, since the liquid within the pump casing cannot pass the tangential point or the point where the cylinder engages the inner wall of the casing as heretofore explained. It will be understood that the terms inlet and outlet as applied to the main ports are only for convenience of description, since the said ports are alternately inlet and outlet depending on the direction of the rotation of the axles or the direction in which the train is traveling. Each port is in communication with a valve casing through which the liquid is circulated through the action of the pump. In each valve casing is located a valve adapted to control the passage or circulation of liquid through the said casing. The pump casing is also provided with check-valve-controlled auxiliary ports located adjacent the main ports and which alternately allow the liquid to enter the casing from the reservoir. The valves controlling these auxiliary ports are so arranged that when one allows the liquid to enter the casing from the reservoir, the other is closed to prevent the escape of the liquid therethrough, since the passage of the liquid from the casing during the brake setting operation is always through a main port only. An auxiliary inlet port, however, is necessary since in adjusting the valves for brake setting purposes, it is more convenient to operate the valves controlling both main ports simultaneously, to avoid confusion when the train is traveling in different directions. Hence during the adjustment of the main outlet valve for brake setting purposes, the main inlet valve is also correspondingly operated; and the liquid enters the pump casing from the reservoir through one of the check-valve-controlled auxiliary ports. From this it will be understood that it is necessary that the pump casing shall always be in communication with the reservoir on the inlet side, while the exit of the liquid from the pump casing is retarded for braking purposes.

In my improved liquid brake construction, the auxiliary inlet port remains constantly open; while the main inlet port remains wide open only when the brakes are not applied. When the train is traveling without the necessity for the application of the brakes, the exit port as well as the main inlet port is wide open; the auxiliary inlet port is also free to open in response to pressure against a light spring. It is evident, however, that when the main inlet port is open, the auxiliary inlet port would actually remain closed due to the action of its spring upon its valve since the liquid would enter the casing through the path of less resistance. The auxiliary inlet port, however, becomes active as soon as the brakes are applied to any extent. When the brakes are not applied, the liquid is simply circulated by the action of the car axle, being taken into the casing through one main port and expelled through the other corresponding port, these ports being of the same size or capacity approximately. Now when it becomes necessary to apply the brakes, the valves for controlling the main inlet and exit ports are both shifted to partially close said ports, or if necessary to entirely close the same. If partially closed the rotation of the axle is resisted in proportion to the degree of closure, that is to say the nearer the exit port is closed, the greater the braking force applied, since it takes the liquid which enters the pump cylinder or the portion of the liquid between any two of the expansible blades, longer to pass through the exit port. In the event that the main outlet port is entirely closed, a relatively small auxiliary exit port is employed to prevent the sliding of the wheels.

From the foregoing explanation it will be understood that the braking force is applied to the car axles rather than to the wheels directly. In other words this is a shoeless braking system and the entire apparatus for supporting shoes adapted to engage treads of the car wheels is done away with and its necessity avoided, obviating the wear on the treads of the wheels incident to the friction of brake shoes, and also doing away with the frequent renewal of the brake shoes and the apparatus employed in connection therewith, due to ordinary wear and tear.

An important feature of my improved system, consists of electro-magnetic means mounted on the cars and operated for the entire train by the engineer, the engine being equipped with a sort of switch board provided with one arm whereby the electric current from a suitable source on the train, is caused to pass through one or more solenoid coils, whereby the valve for controlling the exit port of the pump, may be shifted to any extent desired through the agency of the multiple solenoid coils, each coil being independent of its companion coils but acting either independently or in conjunction therewith as may be desired, depending upon the position of the switch lever as hereinafter explained.

Having outlined my improved construction as well as the function it is intended to perform, I will proceed to describe the same in detail reference being made to the accompanying drawing, in which is illustrated an embodiment thereof.

Figure 8:
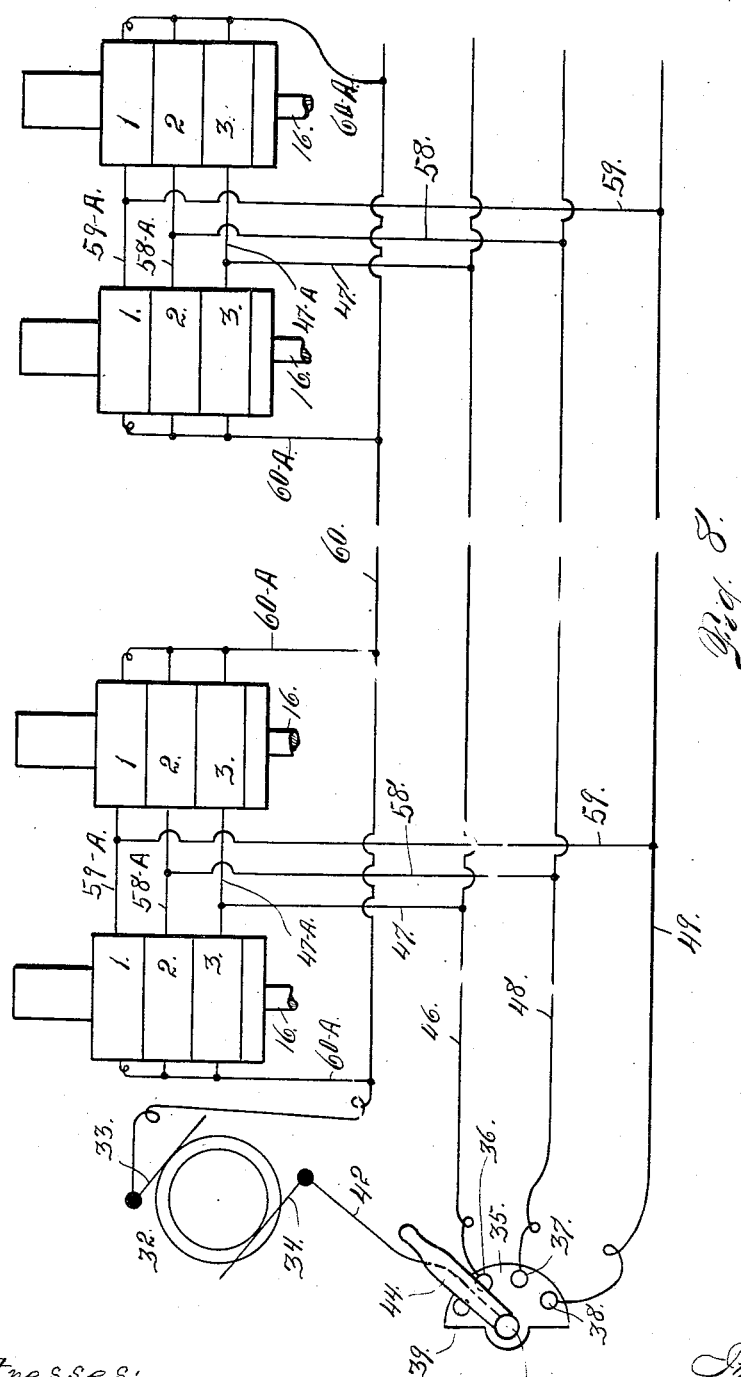
Figure 13:
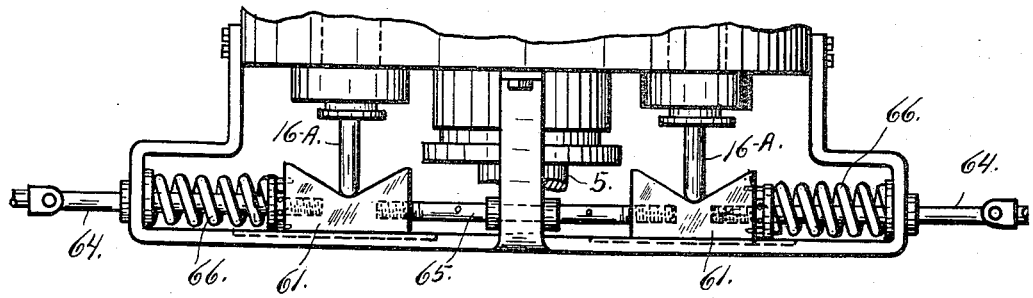
Figure 14:
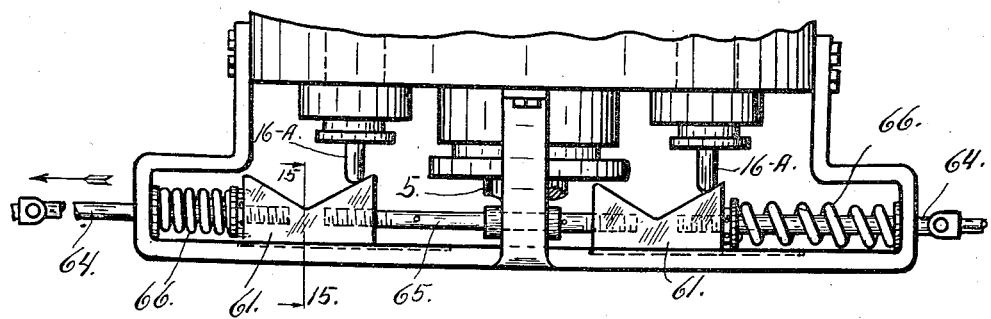
Figure 15:
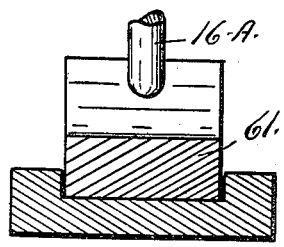

In this drawing, Figure 1 is a plan view of the running gear of a number of cars equipped with my improved liquid brake construction. Fig. 2 is a cross section taken through one of the rotary pumps mounted on the car axle. This section may be said to be taken on the line 2—2 Figs. 1 and 3, parts being shown on a larger scale than in Fig. 1, but on the same scale as in Fig. 3. Fig. 3 is a section taken on the line 3—3 Fig. 2 viewed in the direction of the arrow. Fig. 4 is a sectional view taken through the axles and cross beam of a four wheel truck equipped with my improvements. Figs. 5, 6 and 7 are sectional views taken through the valves for controlling the exit ports of the rotary pumps mounted on the car axles. In these views the electro-magnetic devices or solenoids are also illustrated, the parts being shown on a greatly enlarged scale as compared with Fig. 1. In these views the cam construction for the manual manipulation of these valves is also illustrated but partly broken away. Fig. 8 is a diagrammatic view illustrating the manner of energizing and deënergizing the coils of the solenoids by the use of a switch lever accessible to the engineer, or the manner of controlling from the engine the brakes of all the cars of a train. Fig. 9 shows on a larger scale and partly in diagram the manner of passing the current from one car to another through the medium of a cable containing a series of wires or conductors passing to the coils of the solenoids for regulating the valves adapted to control the ports of the various pumps. Fig. 10 is a socket with which each end of each car is equipped, the same being adapted to receive a plug whereby the various electrical wires or conductors of any car are electrically connected with the corresponding wires or conductors of the adjoining car. Fig. 11 is a cross section of a plug coöperating with the socket shown in Fig. 10. Fig. 12 is a section taken on the line 12—12 Fig. 10. Figs. 13 and 14 illustrate the means for manually manipulating the valves 13 for controlling the main exit port of the pump casing for braking purposes. Fig. 15 is a section taken on the line 15—15 Fig. 14 looking in the direction of the arrow. Fig. 16 is an end elevation of a car equipped with my improved liquid brake mechanism.

The same reference characters indicate the same parts in all the views.

Let the numeral 5 designate the car axles. Upon each of these axles is mounted a rotary pump whose casing 7 is in communication with the liquid reservoir 8 by virtue of main inlet and exit ports 9 and 10, respectively. As shown in the drawing the liquid-containing reservoir is connected with the pump casing by means of bolts 12. Each main port is in communication with a port A which as shown in the drawing is formed integral with the pump casing. Since the valve mechanism is for the control of the passage of liquid out of the pump casing, rather than for controlling the entrance of liquid thereto, in describing this mechanism, it must be understood that the description relates to the manner of controlling the exit port of the pump casing, so far as the performance of the braking function is concerned. As heretofore intimated, however, both main ports are simultaneously and correspondingly controlled during the performance of the brake setting operation for the reason that these ports become alternately exit ports depending on the direction in which the train is traveling. Hence in order to avoid confusion or possible mistake in the operation of these valves, they are connected to be simultaneously operated. On the inlet side, however, an auxiliary port $a$ is employed, the same being controlled by a check valve $b$ adapted to open inwardly, the same, however, being normally closed by a spring $c$. The strength of this spring is so regulated, however, that when the main valve port is closed or partially closed, the liquid from the auxiliary reservoir will enter the pump casing freely. When, however, the main inlet port is wide open, the necessary liquid will enter the pump casing through the last named port exclusively since it will take the easier path, the check valve $b$ remaining closed except when it is necessary to open for inlet purposes. There are two of these check valves $b$, one being located on each side of the pump casing. The one on the exit side performs no function except to keep the port closed on that side. In the event that the exit port 9 or 10 as the case may be is entirely closed, a relatively small exit port $d$ is employed, being adapted to open against a spring $e$ located within a casing $f$ having an outlet port $g$ communicating with the reservoir. There is one of these auxiliary check-valve-controlled exit ports on each side of the casing, adjacent the main port. Only one of the valves, however, namely the one on the exit side of the casing performs any function. It is evident, however, that the two valves become alternately active when the train is traveling in different directions.

In Figs. 5, 6 and 7 one port of each valve casing may be designated 10 since this port is identical with the port 10 of the pump casing. Assuming that the liquid passes from the pump casing through this port 10 into the valve casing, in order to pass entirely through the said casing, it must escape therefrom through a port $10^A$ which is out of alinement or staggered with reference to the port 10. Within this casing is located a valve 13 mounted to reciprocate and having an auxiliary valve 14 connected with the main valve by a reduced member 15. The main valve is of sufficient length to entirely close the exit port $10^A$ of the valve casing, and when this port is closed, the escape of the liquid from the pump casing is cut off and the turning of the wheels will be retarded to the maximum degree. They will not be locked, however, since the liquid will slowly escape through the auxiliary exit port $d$ as heretofore explained, thus preventing the sliding and the consequent flattening of the treads of the wheels. The valve 13 is provided with a stem 16 whose extremity remote from the valve is provided with a head 17 located in a hollow core 18 surrounded by solenoid coils which I will for convenience designate 1, 2 and 3, respectively. Within the hollow core and acting on the head 17 of the valve stem is located a coil spring 19, one extremity of which protrudes into an extension $20^A$ of the main casing 20 in which the solenoids are located. When all of the coils 1, 2 and 3 are de-energized or when the current is cut off therefrom, the head 17 which is composed of soft iron or other magnetic material, is forced by the spring 19, to its limit of movement toward the right (see Figs. 5, 6 and 7), whereby the valve 13 is thrown to a position to close the exit port $10^A$ of the valve casing, thus virtually closing the exit port 10 of the pump casing, since no liquid can leave the pump casing unless it can pass through the valve casing into the reservoir 8. Now if it is desired to shift the valve 13 to partly close the port $10^A$, or shift the valve to the position shown in Fig. 6, the current may be passed through the solenoids 2 and 3, when the soft iron heads 17 will occupy a position midway between the two solenoids. Again if it is desired to shift this valve to completely open the port $10^A$, the current may be passed through the solenoid 1 only, in which the head 13 of the valve stem will be thrown to the position shown in Fig. 7. It is evident that other adjustments of the valve may be obtained by regulating the passage of the current through the solenoids. In fact these solenoids may be arranged to give any desired degree of closure when speaking of the port $10^A$. Now by referring more particularly to Fig. 2, the effect of closing the port $10^A$ upon the car axles will be readily understood. Mounted on each axle 5 and made fast thereto as by a key 23, is a cylinder 22 in which is located a number of blades 24 slidably mounted in grooves 25 in which are located coil springs 26, resting against the axle and acting to throw the blades out against the inner wall of the pump casing 7. This cylinder 22 is tangential to the inner wall of the pump casing, at a point 27 midway between the ports 9 and 10 of the casing. The axle 5 and the cylinder 22 are also eccentrically mounted in the pump casing, thus leaving a crescent-shaped chamber between the cylinder and the inner wall of the said casing. When the train is in motion and the axle 5 is rotating in the direction indicated by the arrow in Fig. 2, the liquid will enter the pump casing through the port 9 and pass out therefrom through the port 10 into the valve casing A and out of the casing A through the port $10^A$ into the body of the liquid in the reservoir 8. Now if the valve 13 is shifted as shown in Fig. 7 so that the port $10^A$ is wide open, there will be virtually no braking resistance, since the resistance of the liquid during its circulation by the pump under the circumstances stated need not be taken into consideration. When, however, it is desired to apply the brakes, the valve may be shifted to the position shown in Fig. 6 for instance, whereby the port 10ᴬ is partly closed, thus to a certain extent retarding the passage of liquid from passing from the crescent-shaped chamber of the pump casing, through the casing A of the valve for controlling the exit port 10; and it is evident that the braking force will be applied to the extent that the escape of the liquid from the pump casing is so retarded. It will also be understood that if the valve is shifted to the position shown in Fig. 5, whereby the port 10ᴬ of the valve casing is entirely closed, thus preventing the escape entirely of the liquid from the pump casing through the port 10, the liquid will continue to escape slowly through the check valve-controlled exit port $d$ adjacent the port 10, whereby the wheels will be allowed to rotate slowly, thus preventing the locking of the axles and the consequent sliding of the wheels and the flattening of their treads. The pump casings are held in position upon the axles by means of arms 28 rigidly connected with the casings as shown at 29, the said arms being supported by links 30 connected at their upper extremities to a cross beam 31 with the truck frame.

I will now explain the manner of controlling the solenoid coils or the manner of regulating the passage of the current therethrough from the cab of a locomotive. This will be best understood by reference to Fig. 8 of the drawing, in which are diagrammatically illustrated the solenoids for controlling one truck or the valves for the rotary pumps mounted on a pair of axles. In this case let the numeral 32 designate a dynamo or electrical generator mounted on a locomotive and provided with contacts or brushes 33 and 34. In describing the passage of the current, it may be said to leave the dynamo or generator at the brush 34 and return at the brush 33. A switch board 35 is mounted on the locomotive and is provided with a series of contacts 36, 37 and 38. A conductor 42 leads from the brush 34 to a centrally located contact pin 43 of the switch board. Pivotally connected with this pin is a contact arm 44. We will assume that the arm 44, controls the passage of the current to the solenoid coils 1, 2 and 3, for the purpose of shifting the valve 13 for regulating the discharge of the liquid from the pump casing through the exit port of the latter. If we assume that the lever 44 is not in communication with any one of the contacts 36, 37, 38 but is upon a dead point or contact 39 of the switch board and not overlapping an adjacent contact, the valve 13 will be in the position shown in Fig. 5 whereby the valve casing 10ᴬ is closed. This would be the position of the valve in the event that the train should break in two, the coils or electro-magnetic elements being deënergized, the spring acting to close the valve. In this event the liquid could, however, escape slowly through the exit port $d$, thus preventing the locking of the axles and the consequent sliding of the wheels. Now if it is desired to partially open the valve casing port 10ᴬ so that the passage of the liquid out of the pump through said casing shall be permitted to some extent, the switch arm 44 may be moved to the position shown in Fig. 8, that is to say so that it shall engage the contact 36 whereby the current will pass from the dynamo through the conductor 42 to the central pin 43, thence through the switch arm 44 to the contact 36 and thence through a conductor 46, a branch conductor 47, and a conductor 47ᴬ to the coils No. 3 of both solenoids, that is to say the coils for controlling the valves 13 used in connection with both ports 9 and 10, of the solenoids throughout the entire train, whereby the valve 13 is controlled for the purpose stated. It will be understood that the various conductors employed for use in connection with the different coils of the solenoids, are inclosed in a sheath 57 which terminates in the socket 50 at each end of each car. The various wires lead to corresponding contacts 46ᴬ, 48ᴬ and 49ᴬ located within the socket 50 and adapted to engage corresponding contacts with which the plug 53 connected with the flexible cable 54 is provided. This cable 54 has corresponding conductors connected with the conductors of the main line cable and has a plug 53 at each extremity. Again if it is desired to shift the valves 13 to further open the port 10ᴬ, the switch arm 44 may be moved to engagement with the contact 37, in which event the current will pass through the conductor 48, and thence by way of branch conductors 58 and 58ᴬ to the coils No. 2 of both solenoids for manipulating the valves 13 of both the inlet and exit ports; and if it is desired to again shift both valves 13, to further open the ports 10ᴬ, the switch arm 44 may be moved to the contact 38, in which event the current will pass to the conductor 49, and thence by way of branch conductors 59 and 59ᴬ, to the coils 1 of both solenoids, the valves 13 being then in the position shown in Fig. 7, whereby the ports 10ᴬ are practically wide open. It will be understood that when the switch arm is manipulated to control the valves 13 of one car, that they are simultaneously manipulated upon all of the cars of the train by virtue of the electrical connections intermediate the cars as heretofore explained. Each solenoid coil 1, 2 and 3 has a return branch 60ᴬ leading to the main return conductor 60 which is connected with the brush 33 at the opposite pole of the generator.

In case it is desired to manually control valves 13 for the same purpose as heretofore explained, the special mechanism illustrated in Figs. 4, 13, 14 and 16 may be employed. In this event the valves 13 are provided with auxiliary stems 16ᴬ projecting from their casings in the direction opposite the stem 16. Each of these stems 16ᴬ is arranged to be acted upon by a cam member 61 having oppositely inclined faces 62. When this stem 16ᴬ is in the center of the cam between the two inclined faces, (see Figs. 5 and 13), the valve 13 is in position to close the port 10ᴬ, this being the condition when the train is broken apart or when a car is cut out of the train for switching purposes. Now if it is desired to manipulate the valves 13 manually or by hand, these cams will be actuated throughout the train or upon a single car, by actuating a vertically disposed brake rod 62 (see Figs. 4 and 16) whose lower extremity is connected by means of a chain 63 with a rod 64 connected with each cam member. The two cam members for actuating the valves 13 of each pump, are individually connected by a rod 65. The two cams 61 of each pair of valves 13 are acted on from opposite directions by coil springs 66, whereby the valves are normally held in the inactive position or that shown in Fig. 13. When, however, these cams are shifted toward the left as shown in Fig. 14, one of the springs 66 is compressed while the other is distended. Hence as soon as the brake rod 62 is released, the said springs will normally return the valves 13 to their normal position.

From the foregoing description the use and operation of my improved liquid brake for car axles will be readily understood. When the train is moving freely, the exit port 10 of the pump as well as the inlet port 9, is wide open allowing the liquid to circulate freely through the reservoir and pump casing. Now when it is desired to apply the brake the proper switch arm as 44 is shifted to throw the current into one of the coils 1, 2 and 3 of the solenoid or any two of said coils as may be desired, since the width of the arm 44 is such as to bridge the space between two of the contacts, whereby two coils may be simultaneously energized. In this way the engineer on the locomotive has perfect control of the brakes for the entire train.

Having thus described my invention, what I claim is:

1. In a liquid operated brake, the combination with a car axle, of a rotary pump mounted thereon, a liquid-containing reservoir in communication with the pump, valves for regulating the passage of the liquid through the exit port of the pump casing, and electro-magnetic means for operating said valves for the purpose set forth.

2. In a liquid brake for car axles, the combination with the axle, of a pump casing having a cylindrical chamber, a cylinder fast on the axle and eccentrically mounted in the said chamber, the said cylinder being tangential to the inner wall of the chamber between the inlet and exit ports of the latter, valves connected with said cylinder for regulating the liquid, and electro-magnetic means for operating said valves, substantially as described.

3. In a liquid brake for car axles, the combination with the axle, of a pump mounted on the axle, the pump casing having a liquid-containing reservoir and the said casing having inlet and exit ports communicating therewith, valve casings in communication with the respective ports of the pump casing, valves located therein, and suitable means for operating the valves, substantially as described.

4. In a liquid brake for car axles, the combination with the axle, of a rotary pump mounted thereon, a liquid-containing reservoir in communication with the pump casing, a valve for controlling the exit of the liquid from the pump casing, and electro-magnetic means for controlling the position of the valve from the locomotive or other desired point on the train, substantially as described.

5. In a liquid brake for car axles, the combination with the axles of a number of cars, rotary pumps mounted on the axles, each pump having a liquid-containing reservoir in communication with the pump casing by inlet and exit ports, valves for controlling the exit ports of the pumps, and electro-magnetic means controlled from the engine or other desired point on the train, for regulating the position of the said valves, substantially as described.

6. In a liquid-operated brake, the combination with a car axle, of a rotary pump mounted thereon, a liquid-containing reservoir in communication with the pump by main inlet and exit ports, each pump being also provided with a pair of check valve-controlled inlet ports arranged adjacent the main ports, the auxiliary port on the exit side of the casing being held in the closed position while the auxiliary port on the opposite side of the casing is free to open when the main inlet port is closed or partially closed, substantially as described.

7. In a liquid-operated brake, the combination with a car axle, of a rotary pump mounted thereon, a liquid-containing reservoir in communication with the pump by main inlet and exit ports, each pump casing being provided with a pair of check valve-controlled relatively small exit ports, the said ports being arranged adjacent the main inlet and outlet ports, the auxiliary port on the inlet side of the casing remaining closed, while that on the exit side is adapted to open when the main exit port is closed to prevent the sliding of the wheels, substantially as described.

In testimony whereof I affix my signature in presence of two witnesses.

ALFRED P. SCHMUCKER.

Witnesses:
 DENA NELSON,
 A. J. O'BRIEN.